US009102337B2

(12) United States Patent
Van Polen

(10) Patent No.: US 9,102,337 B2
(45) Date of Patent: Aug. 11, 2015

(54) FLOW BATTERY CONTROL SYSTEM FOR A LOCOMOTIVE

(71) Applicant: Electro-Motive Diesel, Inc., LaGrange, IL (US)

(72) Inventor: Jerry Van Polen, Oak Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/310,699

(22) Filed: Jun. 20, 2014

(65) Prior Publication Data

US 2014/0299014 A1 Oct. 9, 2014

Related U.S. Application Data

(62) Division of application No. 13/404,879, filed on Feb. 24, 2012, now Pat. No. 8,789,473.

(51) Int. Cl.
*B61C 3/00* (2006.01)
*H01M 2/38* (2006.01)
*B61C 3/02* (2006.01)
*B61C 17/12* (2006.01)
*H01M 10/42* (2006.01)

(52) U.S. Cl.
CPC ... *B61C 3/00* (2013.01); *B61C 3/02* (2013.01); *B61C 17/12* (2013.01); *H01M 2/38* (2013.01); *H01M 10/4214* (2013.01); *Y02T 30/12* (2013.01)

(58) Field of Classification Search
CPC ............ B61C 3/00; B61C 7/04; B61C 17/06; H01M 2/38; H01M 2/36; H01M 8/20; Y02E 60/12; Y02E 60/528; B60L 7/10; B60L 15/2045; B60L 25/025; B60L 27/0027; B60L 2200/26; B60L 2260/54; B60L 11/1824; B60L 11/1879; B60L 2210/40; B60L 2230/24
USPC ......... 105/26.05, 35, 49, 50, 51; 318/139, 51, 318/49, 243, 66, 376, 375, 108
See application file for complete search history.

(56) References Cited

U.S. PATENT DOCUMENTS

| | | | |
|---|---|---|---|
| 6,591,758 B2 | 7/2003 | Kumar | |
| 7,349,797 B2 | 3/2008 | Donnelly et al. | |
| 7,723,932 B2 * | 5/2010 | King et al. | 318/139 |
| 7,820,321 B2 * | 10/2010 | Horne et al. | 429/149 |

(Continued)

FOREIGN PATENT DOCUMENTS

WO WO 2009/067301 A2 5/2009
WO WO 2009/156259 A1 12/2009

*Primary Examiner* — Jason C Smith
(74) *Attorney, Agent, or Firm* — Finnegan, Henderson, Farabow, Garrett & Dunner, LLP

(57) ABSTRACT

A flow battery system may include at least one electrolyte tank for storing electrolytes. The system may also include a plurality of reaction cells, each having an output current. The system may further include a plurality of pumps, each associated with one of the plurality of reaction cells, for pumping the electrolytes into the reaction cell at a flow rate. The system may also include a pump sensor configured to monitor the flow rate of at least one of the plurality of pumps. The system may also include an output sensor configured to monitor an output current of at least one of the plurality of reaction cells. The system may further include a controller configured to control the flow rate of at least one of the plurality of pumps based on the output current of the reaction cell associated with the at least one of the plurality of pumps.

4 Claims, 3 Drawing Sheets

(56) References Cited

U.S. PATENT DOCUMENTS

| | | |
|---|---|---|
| 7,891,302 B2 | 2/2011 | Bachman |
| 7,940,016 B2 | 5/2011 | Donnelly et al. |
| 8,027,760 B2 | 9/2011 | Chattot |
| 8,062,169 B2 * | 11/2011 | Marr et al. ............... 477/3 |
| 2008/0000381 A1 | 1/2008 | Bartley et al. |
| 2009/0220847 A1 * | 9/2009 | Oshima et al. ............ 429/34 |
| 2010/0174484 A1 * | 7/2010 | Sivasubramaniam et al. .................. 701/213 |
| 2010/0212539 A1 * | 8/2010 | Iden ........................ 105/35 |
| 2013/0220163 A1 * | 8/2013 | Polen ....................... 105/49 |
| 2013/0220164 A1 * | 8/2013 | Polen ....................... 105/50 |

* cited by examiner

FLOW BATTERY CONTROL SYSTEM FOR A LOCOMOTIVE

This is a divisional of application Ser. No. 13/404,879, filed Feb. 24, 2012, which is incorporated herein by reference.

TECHNICAL FIELD

This disclosure relates generally to flow batteries and, more specifically, to a control system for flow batteries in a locomotive.

BACKGROUND

As a result of rising fuel costs and emissions concerns, the transportation industries are looking for cost-efficient and environmentally friendly alternatives for powering vehicles. In particular, this has resulted in the development of electrically powered locomotives, including hybrid and electric locomotives.

Traditional locomotives are typically powered by diesel electric engines in which a diesel motor drives an electric generator that produces power to drive the traction motors and other locomotive systems. The use of a locomotive energy system that is further able to capture energy generated by the traction motors during regenerative braking is one solution for increasing the efficiency of the locomotive. For example, batteries may be used to capture and provide energy for hybrid locomotives. For batteries to provide a feasible solution to the energy requirements of locomotives, a practical method of controlling and implementing these systems under the size and weight constraints of a locomotive is desirable.

One solution for energy management of hybrid locomotives is described in U.S. Pat. No. 6,591,758 B2 ("the '758 patent"). The '758 patent is directed to a hybrid energy locomotive system having an energy storage and regeneration system that may purportedly be located in a separate energy tender vehicle. The energy storage and regeneration system captures dynamic braking energy, excess motor energy, and externally supplied energy and stores the captured energy in one or more energy storage subsystems, including a flywheel, a battery, an ultra-capacitor, or a combination of such subsystems. The energy storage and regeneration system can be located in a separate energy tender vehicle, which is optionally equipped with traction motors. An energy management system is responsive to power storage and power transfer parameters, including data indicative of present and future track profile information, to determine present and future electrical energy storage and supply requirements. The energy management system controls the storage and regeneration of energy accordingly.

Although the system and method disclosed in the '758 patent may store and regenerate energy on a locomotive, the system and method disclosed in the '758 patent may still suffer from a number of possible drawbacks. For example, the system and method disclosed in the '758 patent does not incorporate a flow battery system into a locomotive, nor does it disclose a method of controlling a flow battery system to regulate the output current of the reaction cells. Additionally, the '758 patent does not disclose a method of powering an auxiliary load when the system is in standby. Therefore, it may be desirable to provide an energy distribution system and method that enables transfer of energy among locomotives in a consist.

The presently disclosed systems and methods may mitigate or overcome one or more of the above-noted drawbacks and/or other problems in the art.

SUMMARY

In one aspect, this disclosure is directed to a flow battery system. The flow battery system may include at least one electrolyte tank for storing electrolytes. The system may also include a plurality of reaction cells, each having an output current. The system may further include a plurality of pumps, each associated with one of the plurality of reaction cells, for pumping the electrolytes into the reaction cell at a flow rate. The system may also include a pump sensor configured to monitor the flow rate of at least one of the plurality of pumps. The system may also include an output sensor configured to monitor an output current of at least one of the plurality of reaction cells. The system may further include a controller configured to control the flow rate of at least one of the plurality of pumps based on the output current of the reaction cell associated with the at least one of the plurality of pumps.

According to another aspect, this disclosure is directed to a method of controlling the electrical output of a flow battery system. The flow battery system may include a plurality of reaction cells, each reaction cell having an output current and a plurality of pumps, each pump having a flow rate. The method may include monitoring the flow rates associated with the plurality of pumps. The method may also include monitoring the output currents associated with the reaction cells. The method may further include controlling the flow rate of at least one of the plurality of pumps based on the output current of the reaction cell associated with the at least one of the plurality of pumps.

In accordance with another aspect, a locomotive may include a plurality of axles and a plurality of pairs of wheels, each pair of wheels connected to one of the plurality of axles. The locomotive may also include a plurality of traction motors, each traction motor rotatably coupled to one of the axles. The locomotive may further include a flow battery system configured to at least partially power the plurality of traction motors. The flow battery system may include at least one electrolyte tank for storing electrolytes. The flow battery system may also include a plurality of reaction cells, each having an output current. The flow battery system may further include a plurality of pumps, each associated with one of the plurality of reaction cells, configured to pump the electrolytes into the one of the plurality of reaction cells at a flow rate. The flow battery system may also include a pump sensor configured to monitor the flow rate of at least one of the plurality of pumps and an output sensor configured to monitor an output current of at least one of the plurality of reaction cells. The flow battery system may further include a controller configured to control the flow rate of at least one of the plurality of pumps based on the output current of the at least one of the plurality of reaction cells associated with the at least one of the plurality of pumps.

DETAILED DESCRIPTION

Figure 1:
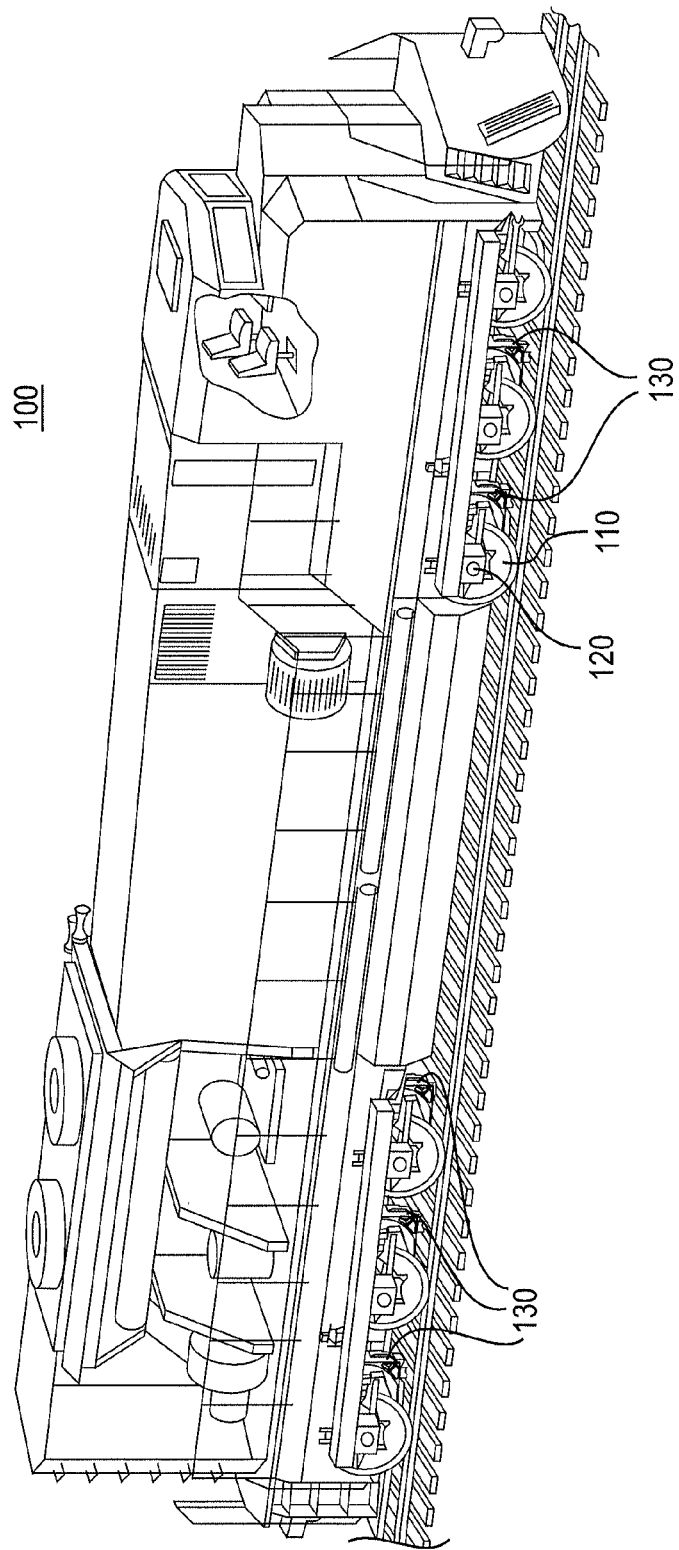
FIG. 1 is a perspective view of an exemplary embodiment of a locomotive.

FIG. 1 shows a perspective view of an exemplary embodiment of a locomotive 100 in which systems and methods for energy distribution may be implemented consistent with the disclosed embodiments. Locomotive 100 may be any electrically powered rail vehicle employing traction motors for propulsion. Furthermore, any electrically powered vehicle could also incorporate the systems and methods for energy distribution consistent with the disclosed embodiments.

According to the exemplary embodiment illustrated in FIG. 1, locomotive 100 may include a plurality of pairs of wheels 110, with each pair of wheels 110 connected to an axle 120. Each axle 120 may be rotatably coupled to a traction motor 130 that is configured to provide force for propelling locomotive 100. Locomotive 100 may also include an energy distribution system 140 configured to at least partially power the plurality of traction motors 130 of locomotive 100. For example, when one or more of traction motors 130 supplies force for propelling locomotive 100, traction motors 130 provide a load on energy distribution system 140 (see FIG. 2). According to some embodiments, one or more of traction motors 130 may be configured to operate as electric generators, for example, when traction motors 130 act to reduce the speed of locomotive 100, for example, via regenerative braking. According to such embodiments, when traction motors 130 act to reduce the speed of locomotive 100, some embodiments of energy distribution system 140 may be configured to store and/or divert energy supplied by traction motors 130 for use at a later time and/or by other parts of locomotive 100 (e.g., other traction motors 130).

Figure 2:
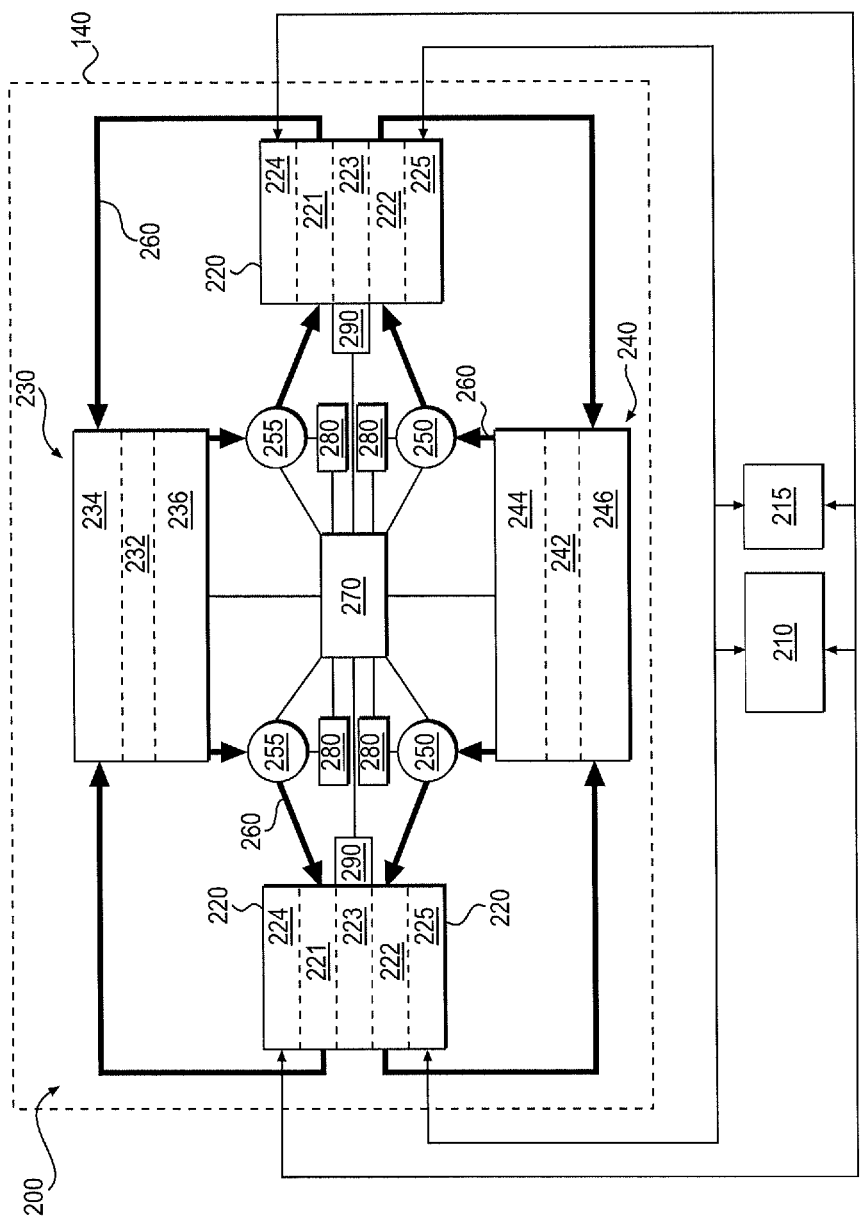
FIG. 2 is a block diagram of an exemplary embodiment of an energy distribution system.

FIG. 2 is a block diagram of an exemplary embodiment of an energy distribution system 140. As shown in FIG. 2, exemplary energy distribution system 140 may include a flow battery system 200. Exemplary flow battery system 200 shown in FIG. 2 is configured for use with a load 210 and an auxiliary load 215. For example, load 210 may represent the loads on energy distribution system 140 when traction motors 130 operate to propel locomotive 100. Auxiliary loads 215 may represent the loads on energy distribution system 140 from other systems (not shown), such as controllers that operate locomotive 100. Exemplary energy distribution system 140 shown in FIG. 2 is configured for use with one load 210 and one auxiliary load 215, but it is contemplated that the exemplary energy distribution system 140 can accommodate more loads 210 and/or auxiliary loads 215.

As shown in FIG. 2, exemplary flow battery system 200 may include a plurality of reaction cells 220. The exemplary system shown in FIG. 2 includes two reaction cells 220, but flow battery system 200 can be modified to include more reaction cells 220. Each reaction cell 220 may include two half-cells 221 and 222 separated by a membrane 223. Flow battery system 200 may operate to provide energy by a chemical reaction caused by two electrolytes. For example, the two electrolytes, which act as energy carriers, may each be delivered into one of the two half-cells 221 and 222. For example, half-cell 221 may receive positively charged electrolytes, and half-cell 222 may receive negatively charged electrolytes. Membrane 223 may prevent the two electrolytes from mixing with one another, but may allow selected ions to pass through to complete a reduction-oxidation ("redox") reaction, which causes electricity to flow through reaction cell 220, thereby creating a voltage difference between a pair of electrodes 224 and 225 associated with reaction cell 220.

In the exemplary embodiment shown in FIG. 2, to deliver power to load 210 and/or auxiliary load 215, the chemical energy contained in the electrolytes may be released in a reverse reaction, and electrical energy can be drawn from electrodes 224 and 225. FIG. 2 shows load 210 and auxiliary load 215 electrically connected to electrodes 224 and 225 to receive power from reaction cell 220. To charge the electrolytes, energy distribution system 140 may supply electrical energy to half-cells 221 and 222, which may cause a chemical reduction reaction in one electrolyte mixture and an oxidation reaction in the other. For example, FIG. 2 shows load 210 and auxiliary load 215 that may operate as energy sources, such as generators, providing power to charge electrolytes in half-cells 221 and 222 of reaction cells 220. According to some embodiments, one or more of exemplary traction motors 130 shown in FIG. 1 may be able to operate as both an electrical load and as a generator.

The electrolytes may contain one or more dissolved electroactive species. The two electrolytes may include positively charged electrolytes and negatively charged electrolytes. For example, the electrolytes may include vanadium ions in different oxidation states. Alternatively, the electrolytes may include polysulfide bromide, uranium, zinc-cerium, or zinc-bromide. There are a variety of other chemical compounds and combinations known in the art that are capable of acting as electroactive species, and it is contemplated that the electrolytes used in exemplary flow battery system 200 may include one or more of those compounds and combinations.

Exemplary flow battery system 200 may include an electrolyte tank for storing electrolytes. For example, flow battery system 200 in FIG. 2 includes two electrolyte tanks 230 and 240. Electrolyte tanks 230 and 240 may be located separately from reaction cell 220 and may be configured to deliver the stored electrolytes to reaction cell 220. For example, first electrolyte tank 230 may store positively charged electrolytes and second electrolyte tank 240 may store negatively charged electrolytes. In some embodiments, first electrolyte tank 230 may store cathode electrolytes ("catholytes") and second electrolyte tank 240 may store anode electrolytes ("anolytes"). In this configuration, first electrolyte tank 230 may provide positively charged electrolytes to half-cell 221, and second electrolyte tank 240 may provide negatively charged electrolytes to half-cell 222.

According to some embodiments, first electrolyte tank 230 may be configured to provide positively charged electrolytes to a plurality of half-cells 221. Similarly, second electrolyte tank 240 may be configured to provide negatively charged electrolytes to a plurality of half-cells 222. In this manner, electrolyte tanks 230 and 240 may supply electrolytes to multiple reaction cells 220 to power one or more loads 210 and/or auxiliary loads 215. Likewise, electrolyte tanks 230 and 240 may supply electrolytes to multiple reaction cells 220 to charge electrolytes from one or more loads 210 and/or auxiliary loads 215 operating as power sources, such as during regenerative braking.

According to some embodiments, first electrolyte tank 230 may be configured to provide positively charged electrolytes to only one half-cell 221. Similarly, second electrolyte tanks 240 may be configured to provide negatively charged electrolytes to only one half-cell 222. In this configuration, each pair of electrolyte tanks 230 and 240 may supply electrolytes to a single reaction cell 220 to power one or more loads 210 and/or auxiliary loads 215.

According to some embodiments, one or more of electrolyte tanks 230 and 240 may be configured to store both charged and uncharged electrolytes. For example, first electrolyte tank 230 may include a first tank separator 232 to prevent charged electrolytes from mixing with uncharged electrolytes. In a similar manner, second electrolyte tank 240 may include a second tank separator 242. For example, in FIG. 2, charged electrolytes may be stored in a tank portion 234 of electrolyte tank 230, and discharged electrolytes may be stored in a tank portion 236 of electrolyte tank 230. Similarly, charged electrolytes may be stored in a tank portion 244 of electrolyte tank 240, and discharged electrolytes may be stored in a tank portion 246 of electrolyte tank 240. In some embodiments, the relative charge of the electrolytes stored in portions 234, 236, 244, and 246 of electrolyte tanks 230 and 240 varies during operation of energy distribution system 140. That is, portion 234 and 244 may start out storing discharged electrolytes, but through the course of operation, portions 234 and 244 may store electrolytes that have been charged via, for example, regenerative braking of traction motors 130.

Tank separators 232 and 242 may be movable and able to travel within electrolyte tanks 230 and 240, respectively, to account for changing volumes of charged and discharged electrolytes as flow battery system 200 operates to charge or discharge the electrolytes. According to some embodiments, tank separators 232 and 242 may be buoyant. Alternatively or additionally, tank separators 232 and 242 may include flow passages that may be selectively opened and closed to allow electrolytes to travel through separator to the other side of electrolyte tank 230 and 240 for mixing. Other configurations of tank separators 232 and 242 will be apparent.

As shown in FIG. 2, exemplary flow battery system 200 may also include a plurality of pairs of pumps 250 and 255. For example, each pair of pumps 250 and 255 may be associated with at least one reaction cell 220. Pumps 250 and 255 may be configured to pump electrolytes between electrolyte tanks 230 and 240 and reaction cell 220 through conduits 260. For example, first pump 250 may pump negatively charged electrolytes from electrolyte tank 240 through conduit 260 into half-cell 222 of reaction cell 220. In a similar manner, second pump 255 may pump positively charged electrolytes from electrolyte tank 230 through conduit 260 into half-cell 221 of reaction cell 220.

Exemplary flow battery system 200 may include a controller 270 to control the operation of pumps 250 and 255. According to some embodiments, controller 270 may be configured to change the flow rates of one or more pumps 250 and 255. Additionally, or alternatively, controller 270 may also be configured to receive signals indicative of the real-time status of flow battery system 200 and/or the components of the system. For example, controller 270 may receive signals representative of the flow rates of each of pumps 250 and 255 and the output currents of each of reaction cells 220. Controller 270 may embody a single microprocessor or multiple microprocessors that include a means for controlling the operation of pumps 250 and 255 and for communicating with load 210 and auxiliary load 215. Numerous commercially available microprocessors can be configured to perform the functions of controller 270. It should be appreciated controller 270 could readily embody a general machine or engine microprocessor capable of controlling numerous machine or engine functions. Controller 270 may include all the components required to run an application such as, for example, a memory, a secondary storage device, and a processor, such as a central processing unit or any other means known. Various other known circuits may be associated with controller 270, including power source circuitry (not shown) and other appropriate circuitry.

According to some embodiments, controller 270 may be configured to control the operation of one or more of pump 250 and 255 based on, for example, the power needs of one or more of loads 210 and/or auxiliary loads 215. The power requirements of loads 210 and auxiliary loads 215 may be understood in terms of electrical energy, and a correlation may exist between the electrical energy that reaction cells 220 may supply through electrodes 224 and 225 and the flow rates of one or more of pumps 250 and 255. This correlation may depend on a variety of factors, such as, for example, the average fluid energy density or the average electrode power density of the electrolytes. Other environmental factors may also affect this correlation, such as the temperature of flow battery system 200 and/or the capacity of pumps 250 and 255.

According to some embodiments, controller 270 may receive sensor data from a variety of sensors. For example, a plurality of sensors 280 (e.g. pump sensors) may be configured to provide signals to controller 270 indicative of the flow rate of electrolytes through conduits 260 associated with one of pumps 250 and 255. Additionally, or alternatively, flow battery system 200 may include a plurality of sensors 290 (e.g. output sensors) configured to monitor and to provide signals to controller 270 indicative of the output current of at least one of reaction cells 220. In some embodiments, sensors 290 may be configured to monitor and provide signals to controller 270 indicative of the output current or voltage of at least one of reaction cells 220.

According to some embodiments, controller 270 may be configured to receive signals indicative of the magnitude of output current and/or output voltage supplied by one or more of reaction cells 220, and control the operation of one or more of pumps 250 and 255 based on those signals. Based on the information that controller 270 receives from the sensors, controller 270 may be configured to increase the flow rate of at least one of pumps 250 and 255 associated with reaction cell 220 having an output current that is lower than at least one of the output currents of other reaction cells 220. Additionally, or alternatively, based on the information that controller 270 receives from the sensors, controller 270 may be configured to control the flow rates of pumps 250 and 255 to maintain a desired voltage level for reach of reaction cells 220 and/or to maintain the same output current for each of reaction cells 220.

According to some embodiments, controller 270 may be configured to receive signals indicative of the operation mode of flow battery system 200. Additionally, or alternatively, controller 270 may be configured to receive signals indicative of a request to power particular loads 210 and/or auxiliary loads 215. For example, controller 270 may be configured to identify when flow battery system 200 is in a standby mode and to receive a request to power auxiliary load 215 during the standby mode. Controller 270 may selectively operate at least one of reaction cells 220 to provide power to auxiliary load 215, based on the request to power auxiliary load 215. In selectively operating at least one of reaction cells 220, controller 270 may choose which reaction cell 220 to operate based on the output voltages of each of reaction cells 220. Additionally, or alternatively, controller 270 may choose which reaction cell 220 to selectively operate based on which reaction cells 220 have been previously selectively operated in the standby mode.

According to some embodiments, the control of pumps 250 and 255 may depend on the configuration of flow battery system 200. For example, in embodiments in which each reaction cell 220 is associated with a separate load, controller 270 may be configured to control the flow rates of pumps 250 and 255 based on the electrical requirements of the separate loads. For example, in embodiments in which reaction cells 220 are connected in parallel to one another, controller 270 may be configured to control the flow rates of pumps 250 and 255 to maintain the same output current from each of reaction cells 220.

Figure 3:
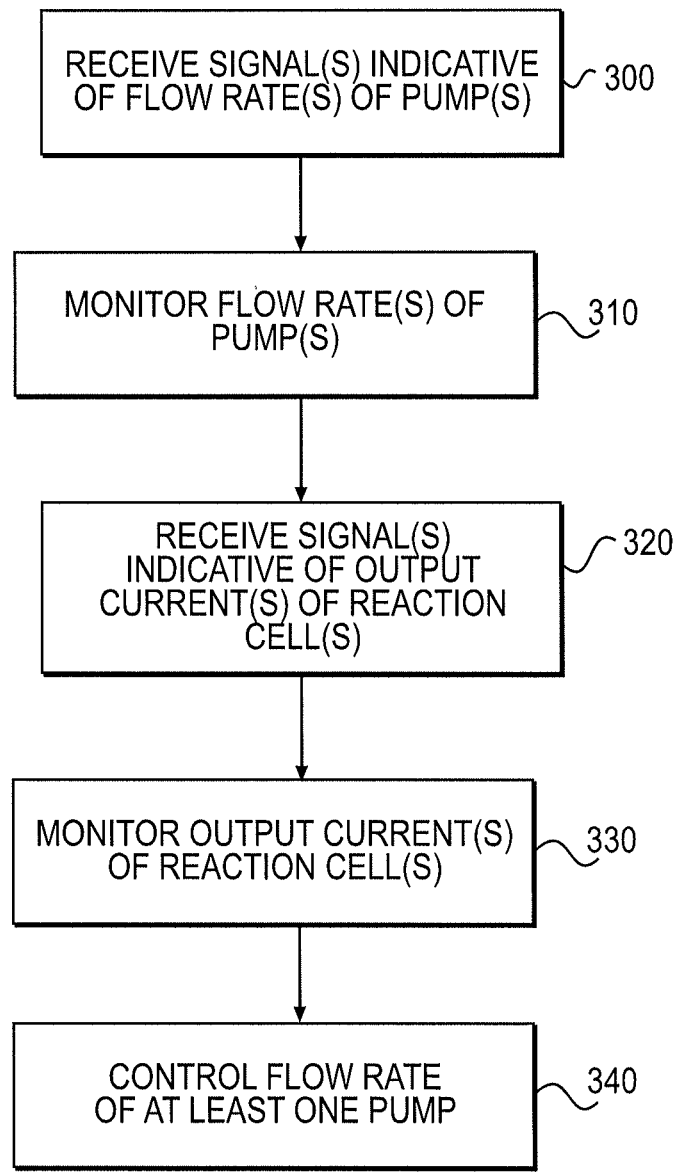
FIG. 3 is a flow diagram depicting an exemplary embodiment of a method of controlling a flow battery system.

FIG. 3 is a flow diagram depicting an exemplary method of controlling flow battery system 200. At step 300, controller 270 may receive one or more signals indicative of the flow rates of each of pumps 250 and 255, and at step 310, controller 270 may monitor the flow rates of each of pumps 250 and 255.

At step 320 controller 270 may receive one or more signals indicative of the output currents associated with each of reaction cells 220. At step 330, controller 270 may monitor the output currents associated with each of reaction cells 220.

At step 340, controller 270 may control the flow rate of at least one of pumps 250 and 255 based on the output current of the reaction cell associated with the at least one of pumps 250 and 255. According to some embodiments, controlling the flow rates of at least one of pumps 250 and 255 may include maintaining a desired voltage output for each of reaction cells 220. Additionally, or alternatively, controlling the flow rates may include maintaining the same output current from each of reaction cells 220.

According to some embodiments, the method may also include determining an electrical requirement of a load associated with at least one reaction cell 220. For example, controller 270 may receive these signals indicative of the electrical requirement from sensors, such as output sensors 290, or from the load itself. In some embodiments, the signals indicative of the electrical requirements of loads 210 and/or auxiliary loads 215 may be indicative of operator commands (e.g., via an operator input device for controlling the output of loads 210 and/or auxiliary loads 215). The method may also include controlling the flow rates of at least one pump 250 and 255 based on the electrical requirement of load 210 and/or auxiliary load 215. For example, controlling the flow rates based on the electrical requirements of load 210 and/or auxiliary load 215 may include providing a sufficient flow of electrolytes to a reaction cell 220 associated with the load and/or auxiliary load to meet the desired output.

INDUSTRIAL APPLICABILITY

The disclosed systems and methods may provide a robust solution for electric locomotive tractive powering. By allowing dynamic control of flow batteries in both discharging and charging modes, the systems and methods described herein may result in locomotives powered at least partially by battery being a viable alternative to locomotives powered primarily by fossil fuels. As a result, operating costs associated with locomotives may be significantly reduced and more predictable as they may be less reliant on changing (and increasing) fossil fuel costs.

The disclosed systems and methods may provide several advantages. For example, selectively operating particular reaction cells to power an auxiliary load when the flow battery system is in standby mode may increase the working life of the reaction cells. A reaction cell may have a finite number of charge cycles during its lifetime, and balancing the charge cycles of all the reaction cells in a system may decrease the time spent replacing reaction cells.

Additionally, controlling the flow rate of pumps may provide a method of increasing the efficiency of locomotives as the power provided to each of the loads can be more precisely controlled. For example, the flow rate of pumps may be adjusted to account for changes in conditions that affect the electrical output of the reaction cells.

It will be apparent to those skilled in the art that various modifications and variations can be made to the exemplary flow battery control system. Other embodiments of the present disclosure may be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A locomotive, comprising:
a plurality of axles;
a plurality of pairs of wheels, each pair of wheels connected to one of the plurality of axles;
a plurality of traction motors, each traction motor rotatably coupled to one of the axles; and
a flow battery system configured to at least partially power the plurality of traction motors, the flow battery system comprising:
at least one electrolyte tank for storing electrolytes;
a plurality of reaction cells, each having an output current;
a plurality of pumps, each associated with one of the plurality of reaction cells, configured to pump the electrolytes into the one of the plurality of reaction cells at a flow rate;
a pump sensor configured to monitor the flow rate of at least one of the plurality of pumps;
an output sensor configured to monitor an output current of at least one of the plurality of reaction cells; and
a controller configured to control the flow rate of at least one of the plurality of pumps based on the output current of the at least one of the plurality of reaction cells associated with the at least one of the plurality of pumps, wherein the output current of each of the plurality of reaction cells is the same, and the reaction cells are connected in parallel to one another.

2. The locomotive of claim 1, wherein the controller is configured to further control the flow rates of the plurality of pumps to maintain a desired voltage output for each of the reaction cells.

3. The locomotive of claim 1, wherein the controller is further configured to:
identify when the flow battery system is in a standby mode;
receive a request to power an auxiliary load during the standby mode; and
selectively operate at least one of the plurality of reaction cells to provide power to the auxiliary load in the standby mode.

4. A locomotive, comprising:
a plurality of axles;
a plurality of pairs of wheels, each pair of wheels connected to one of the plurality of axles;
a plurality of traction motors, each traction motor rotatably coupled to one of the axles; and
a flow battery system configured to at least partially power the plurality of traction motors, the flow battery system comprising:
at least one electrolyte tank for storing electrolytes;
a plurality of reaction cells, each having an output current;
a plurality of pumps, each associated with one of the plurality of reaction cells, configured to pump the electrolytes into the one of the plurality of reaction cells at a flow rate;
a pump sensor configured to monitor the flow rate of at least one of the plurality of pumps;
an output sensor configured to monitor an output current of at least one of the plurality of reaction cells; and
a controller configured to
control the flow rate of at least one of the plurality of pumps based on the output current of the reaction cell associated with the at least one of the plurality of pumps;
identify when the flow battery system is in a standby mode;

receive a request to power an auxiliary load during the standby mode; and selectively operate at least one of the plurality of reaction cells to provide power to the auxiliary load in the standby mode.

* * * * *